Figure 1:
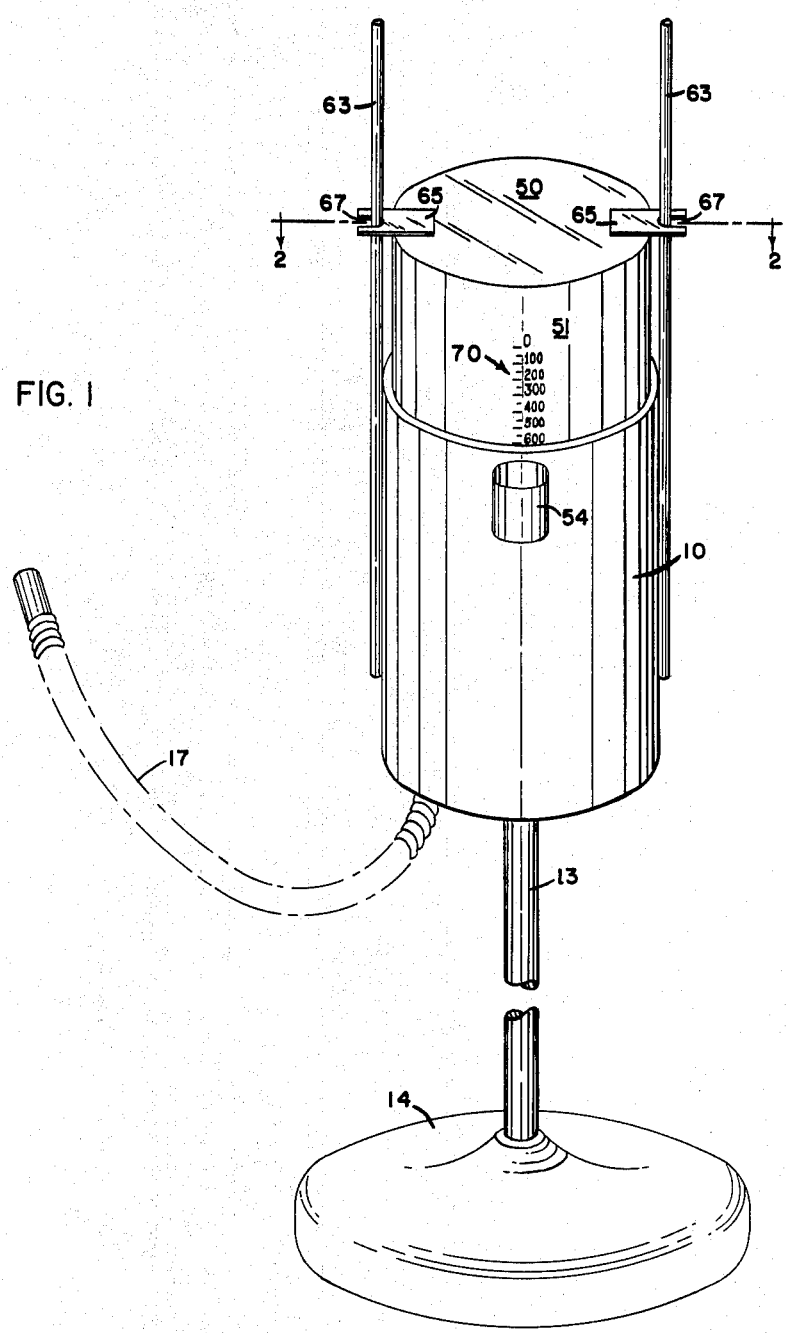

Dec. 7, 1965  R. A. MILLER ETAL  3,221,732
MEASUREMENT OF EXPIRED TIDAL AIR VOLUME
Filed Feb. 11, 1963  3 Sheets-Sheet 1

INVENTORS.
RONALD A. MILLER.
JOHN R. POTRAFKA.
BY
D. Emmett Thompson
THEIR ATTORNEY.

Dec. 7, 1965    R. A. MILLER ETAL    3,221,732
MEASUREMENT OF EXPIRED TIDAL AIR VOLUME
Filed Feb. 11, 1963    3 Sheets-Sheet 3
FIG. 3
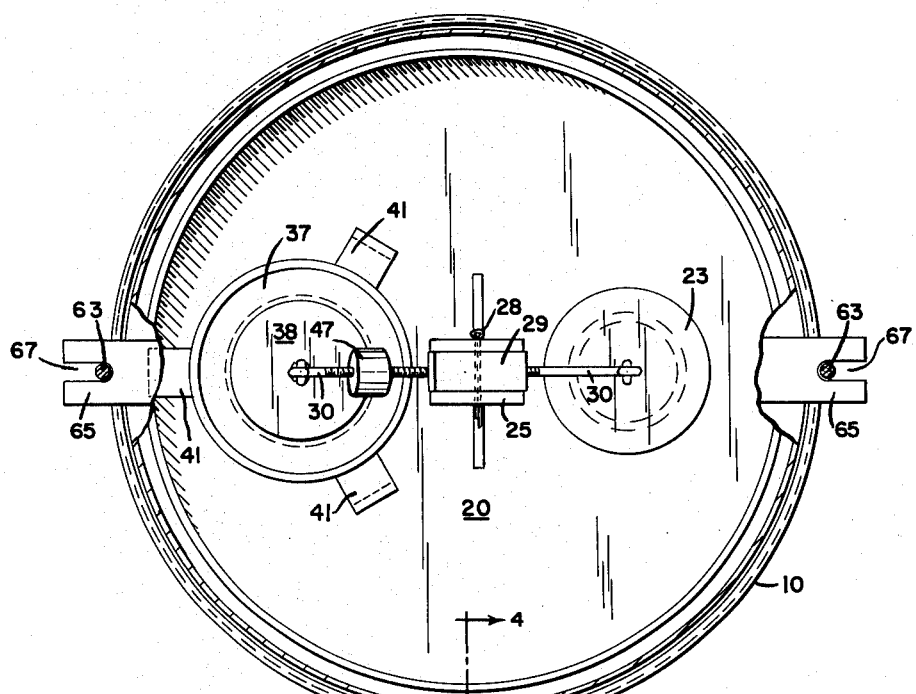
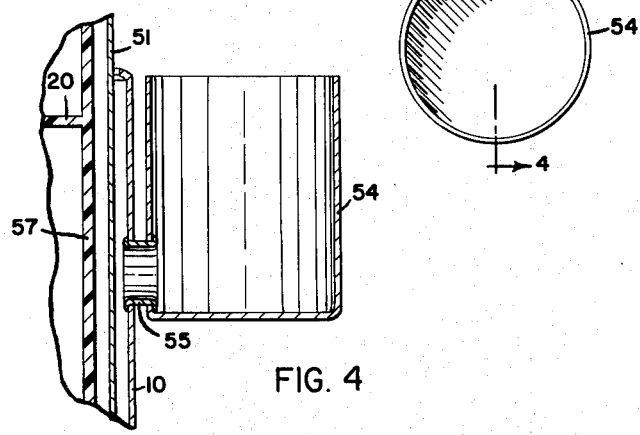
FIG. 4
INVENTORS.
RONALD A. MILLER.
JOHN R. POTRAFKA.
BY
D. Emmett Thompson
THEIR ATTORNEY.

United States Patent Office 3,221,732
Patented Dec. 7, 1965

3,221,732
MEASUREMENT OF EXPIRED TIDAL AIR VOLUME
Ronald A. Miller, 207 Woodland Road, Syracuse, N.Y., and John R. Potrafka, Otter Lake, N.Y.
Filed Feb. 11, 1963, Ser. No. 257,388
5 Claims. (Cl. 128—2.08)

In recent years, physicians have become increasingly interested in pulmonary ventilation and tidal volume as guides to the maintenance of normal alveolar and arterial gas tensions. As a result, considerable effort has been directed toward the development of a simple, practical, apparatus and method for monitoring ventilation and tidal volume which, by inference, may be directly equated with a patient's alveolar and blood gas parameters. Toward this end, a number of respiratory monitoring apparatuses have been developed for clinical use, teaching, and as investigational aids.

Such devices have proven generally to be impractical and unacceptable for use in the average hospital environment. This due mainly to the expensive and complex structures involved, inaccuracy in functioning, lack of portability and difficulty in adapting the devices for use under many conditions.

This invention has as an object, apparatus for the measurement of pulmonary ventilation that embodies a simple, inexpensive, manually portable, structure that functions automatically to accurately and continuously monitor the expired tidal volume of a patient.

The apparatus of the invention is equally suited to tidal measurement of the normally respiring patient, as well as the patient assisted by an intermittent positive pressure device, or a tank respirator. Also, our apparatus may be connected to the closed circuit employed by the anesthetist in instances of unassisted patient breathing.

Our invention has as a further object, an apparatus for the measurement of pulmonary ventilation embodying an arrangement which does not involve any settings, or adjustments, of the functional parts of the apparatus, it being only necessary to connect the intake tube of the apparatus to one of several sources, such as a respiratory aid, if one is used, as an intermittent positive pressure device, or the intake tube may be connected to the out-flow of a one-way valve held to the patient's mouth by a nurse, or aid, or it may be attached to a tracheotomy tube.

The volume indicating means per se employs the basic principle of the spirometer in the form of an inverted cylinder or diving bell.

The invention resides principally in the general structural arrangement and combination including the valve system wherein the intake valve is opened by, and held open by the in-flow of air exhaled by the patient to effect ascent of the diving bell member during the admission of such in-flow. The intake and exhaust valves are interconnected in such manner that the exhaust valve is in closed position while the intake valve is in open position during such in-flow. The intake valve closes immediately upon cessation of such air in-flow. Simultaneously with the closing of the intake valve, the exhaust valve is opened to rapidly exhaust the air underneath the diving bell member to permit its rapid descent, all whereby the apparatus functions for the measurement of expired tidal volume.

The invention consists in the novel features and in the combinations and constructions hereinafter set forth and claimed.

In describing this invention, reference is had to the accompanying drawings in which like characters designate corresponding parts in all the views.

Figure 2:
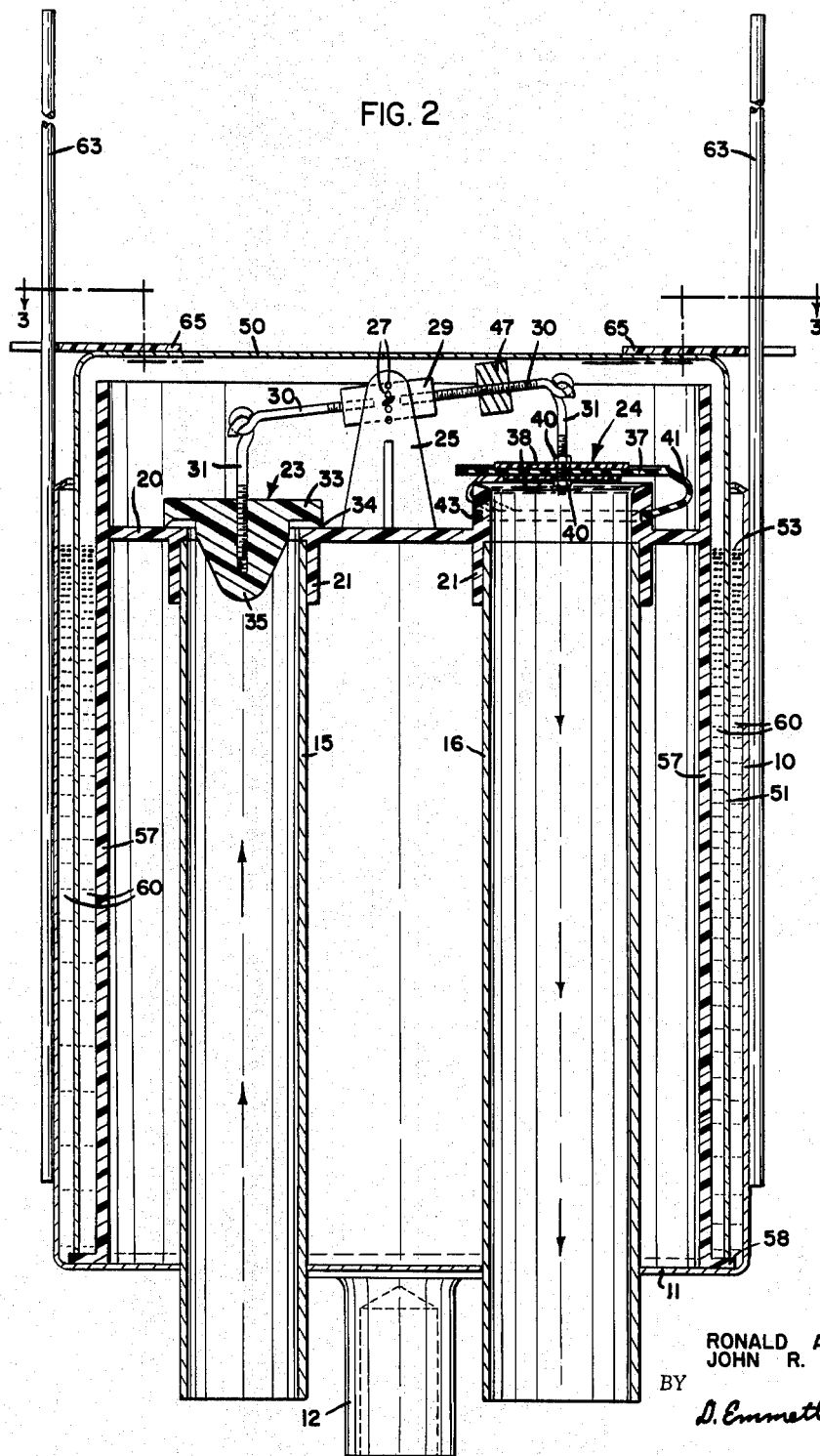

In the drawings:
FIGURE 1 is a perspective view of the apparatus embodying our invention.
FIGURE 2 is a vertical sectional view taken on a line corresponding to line 2—2, FIGURE 1.
FIGURE 3 is a view taken on line 3—3, FIGURE 2.
FIGURE 4 is a view taken on line 4—4, FIGURE 3.

The apparatus comprises a tank 10 shown as of circular form, the tank being open at the top and having a bottom wall 11. A hub 12 is fixedly secured to the bottom wall at the center thereof to receive a supporting stem 13 extending upwardly from a base 14 to support the tank in vertical position.

An intake tube 15 extends upwardly through the bottom wall 11 and terminates at the upper portion of the tank. There is a similar exhaust tube 16. The lower ends of the tubes 15, 16, extend downwardly through the bottom wall 11, the intake tube 15 being connected at its lower end to a conduit, such as a flexible hose 17, the free end of which is connected to any source to obtain tidal expiration from a patient. Such source may consist of respiratory aids, such as an intermittent positive pressure device, or the tube 17 may be connected to the outflow of a one-way valve held to the patient's mouth, or an anesthesia mask held over the patient's nose and mouth, or it may be attached to a tracheotomy tube.

A plate 20 is connected to the upper ends of the intake and exhaust tubes 15, 16. In the form shown, the plate 20 is formed with depending collars 21 to receive the upper ends of the tube 15, 16, the plate being of circular form with its periphery spaced inwardly from the side wall of the tank 10.

Intake and exhaust valves 23, 24, are provided for opening and closing the upper ends of the tubes 15, 16, these valves forming part of a valve structure which also includes a connection between the valves, whereby they are operated alternately and in unison. In the arrangement shown, a bifurcated supporting bracket 25 is fixed to the plate 20 intermediate the tubes 15, 16. The sides of the bracket 25 are fixed to the plate 20 intermediate the tubes 15, 16. The sides of the bracket 25, extending upwardly from the plate 20, are formed with aligned apertures 27 to receive a pivot pin 28 to provide for the pivotal mounting of a block 29. The ends of the block are threaded to receive screw shanks 30, to the free ends of which are pivotally connected stems 31 which, in turn, are connected to the intake and exhaust valves 23, 24. The intake valve 23 is formed with a circular top portion 33 having a narrow annular bead, or knife flange 34, depending from its periphery for sealing engagement with the disk 20. The valve is further formed with a centrally located conical portion 35 depending in the upper end of the intake tube 15. The valve 23 is preferably formed of plastic material.

The exhaust valve 24 is in the form of a flexible thin disk 37 mounted between washers 38, the assembly being affixed to the stem 31 by nuts 40. The disk 37 is formed with three equally spaced, radially extending tabs 41. These tabs extend in the form of a loop, see FIGURE 2, and the free ends of the tabs are anchored in a collar 43 extending upwardly from the plate 20.

The valve arrangement, including the beam structure consisting of the block 29 and screw shank 30, is unbalanced so that the intake valve 23 is normally in closing engagement with the intake tube 15, as shown in FIGURE 2. Upon the in-flow of expired tidal volume from the patient, the in-flow effects upward movement of the valve 23, moving the knife edge 34 of the valve out of engagement with the plate 20 to admit the inflow of air to the area above the plate 20 but, immediately upon cessation of such in-flow, the valve 23 will descend into engagement with the plate 20 to close the intake tube 15. The beam structure 29, 30, provides means therefor for operating the valves 23, 24, alternately and in unison. When the intake valve 23 is moved upwardly by the in-flow through tube 15, the exhaust valve is moved downwardly in closing relation to the exhaust tube 16, whereby the air in-flow builds up in the area above the plate 20. This unbalancing of the valve structure is obtained by adjusting a weight 47 threaded on the shank 30, to which the exhaust valve 24 is connected for sensitive and accurate operation of the valves.

The diving bell member is positioned in the tank 10 and is of cylindrical form complemental to the tank 10. It consists of a closed top wall 50 and a cylindrical side wall 51. The axial length of the diving bell is somewhat greater than the axial length of the tank, and the diving bell encloses the area above the plate 20. A volume of water is placed into the tank, the water line being approximately in the location indicated by the dotted line 53, FIGURE 2. A cup-shaped member 54 is provided at its lower end with a tube 55 extending through the side wall of the tank, the cup member 54 providing a convenient filler for the tank. The water in the tank forms a water seal for the open end of the diving bell member in the conventional manner of such arrangements. Preferably, a cylinder 57 has a tight engagement with the periphery of the plate 20, or is formed integrally therewith as shown in FIGURE 2, and extends downwardly and may be formed with a radially extending flange 58 for securement to the bottom wall 11 of the tank in water tight relation. The cylinder 57 extends upwardly a distance beyond the plate 20. The side wall 51 of the diving bell member is positioned in the space 60 intermediate the side wall of the tank 10, and the cylindrical member 57. This arrangement provides a much smaller area to contain the water seal and greatly lessens the possibility of the water being spilled during movement of the apparatus.

Means is provided for vertically guiding the diving bell member as it is raised by the in-flow of tidal volume through the inlet tube 15. As here shown, guide rods 63 are attached to the external surface of the tank 10 on diametrically opposite sides thereof and extend upwardly a distance beyond the upper end of the tank 10. Tabs 65 are affixed to the top wall 50 of the diving bell member and extend radially therefrom. The radially extending portion of these tabs is formed with a slot 67 to receive the guide rods 63.

In operation, the expired tidal volume of air from the patient entering into the intake tube 15 moves the intake valve 23 upwardly and the exhaust valve 24 downwardly to close the exhaust tube 16. As it increases, the diving bell 50 is moved upwardly. The extent of this upward movement of the diving bell member is in proportion to the volume of the air expired by the patient. As soon as the in-flow stops, the intake valve 23 descends in closing engagement to shut off the intake tube 15, and the exhaust valve 24 is opened. Preferably, the exhaust tube 16 is of substantially greater diameter than the intake tube 15, whereby the air entrapped above the plate 20 is quickly exhausted to permit the diving bell member to rapidly descend to its down position. Accordingly, the tidal volume of each breath expelled by the patient is indicated by the extent to which the diving bell is moved upwardly from its down position.

Indicia, in the form of a series of graduations, as indicated at 70, FIGURE 1, is applied to the external surface of the diving bell wall 51. Preferably, these graduations are applied at four circumferentially internally spaced areas on the diving bell wall 51 so that they may be conveniently observed by the nurse or physician. The diving bell member is formed of thin, light, sheet metal, such as aluminum, and the tab 65 formed of self-lubricating material, such as nylon or Teflon.

What we claim is:

1. Apparatus for the measurement of pulmonary tidal ventilation comprising a vertically disposed tank member having a bottom wall and being open at the top, intake and exhaust tubes extending upwardly from the lower portion of said tank and terminating in the upper portion thereof, means connected to the lower end of said intake tube for conducting tidal expiration from a patient to said inlet tube, intake and exhaust valves for opening and closing the upper ends of said tubes respectively, means for operating said valves alternately in unison, said intake valve being normally in intake tube closing position and being movable to, and maintained in, open position by the inflow of tidal expiration and returning to closed position upon cessation of such in-flow, a diving bell member mounted for vertical movement in said tank member and enclosing the area above the upper ends of said tubes, a volume of water in said tank member forming a water seal for the lower open end of said diving bell member, one of said members bearing indicia and the other member having a portion cooperable with said indicia for indicating the tidal volume of such in-flow.

2. Apparatus for the measurement of pulmonary tidal ventilation comprising a vertically disposed tank member having a bottom wall and being open at the top, intake and exhaust tubes extending upwardly from the bottom wall of said tank, a circular plate mounted on the upper ends of said tubes, the periphery of said plate being spaced inwardly from the side wall of said tank member, means connected to the lower end of said intake tube for conducting tidal expiration from a patient to said inlet tube, intake and exhaust valve structure mounted on said plate for opening and closing said tubes, said valve structure including means connecting said valves to effect alternate operation of said valves in unison, said intake valve being normally in intake tube closing position and being movable to and maintained in open position by the in-flow of tidal expiration and returning to closed position upon cessation of such in-flow, a diving bell member mounted for vertical movement in said tank member and enclosing the area above the upper ends of said intake and exhaust tubes, a volume of water in said tank member forming a water seal for the lower open end of said diving bell member, one of said members bearing indicia and the other member having a portion cooperable with said indicia for indicating the tidal volume of such in-flow.

3. Apparatus for the measurement of pulmonary tidal ventilation comprising a vertically disposed tank having a bottom wall and being open at the top, a plate mounted in the upper portion of said tank, the periphery of said plate being spaced inwardly from the sides of the tank, intake and exhaust tubes extending downwardly from said plate to the bottom wall of said tank, means connected to the lower end of said intake tube for conducting tidal expiration from a patient to said inlet tube, inlet and exhaust valves for opening and closing said tubes, means for alternately operating said valves in unison, said intake valve normally closing said intake tube and being moved to and maintained in open position by the in-flow of expired tidal volume and returning to closed position upon cessation of said in-flow, a diving bell mounted in said tank and enclosing the area above the upper ends of said tubes, a volume of water in said tank forming a water seal for the lower open end of said diving bell, indicia applied to the exterior surface of said bell for indicating the tidal volume of such in-flow.

4. Apparatus for the measurement of pulmonary tidal ventilation comprising a vertically disposed tank having a bottom wall and being open at the top, intake and exhaust tubes extending upwardly from the lower portion of said tank and terminating at the upper portion thereof, a circular plate mounted on the upper ends of said tubes and having its periphery spaced inwardly from the side wall of said tank, a cylindrical member engaging the periphery of said plate and extending downwardly in engagement with the bottom wall of said tank, an intake and exhaust valve structure mounted on said plate including intake and exhaust valves movable to open and close the upper ends of said tubes, and said valve structure including means connecting said valves for alternate operation thereof in unison, said intake valve being normally in intake tube closing position and being movable to and maintained in open position by the in-flow of tidal expiration through said intake tube and returning to closed position upon cessation of such in-flow, a cylindrical diving bell member having its side wall positioned intermediate the side wall of said tank and said cylindrical member, a volume of water in the space between said cylindrical member and the side wall of said tank forming a water seal for the lower open end of said diving bell member, said diving bell enclosing the area above the upper ends of said tubes and carrying on its outer surface indicia for indicating the tidal volume of such in-flow.

5. Apparatus for the measurement of pulmonary tidal ventilation comprising a vertically disposed tank member having a bottom wall and being open at the top, intake and exhaust tubes extending upwardly from the lower portion of said tank and terminating in the upper portion thereof, means connected to the lower end of said intake tube for conducting tidal expiration from a patient to said inlet tube, intake and exhaust valves connected to said tubes respectively for opening and closing the same, said intake valve being normally in closed position and being movable to and maintained in open position by the in-flow of tidal expiration and returning to closed position upon cessation of such in-flow, motion transmitting means connecting said intake and exhaust valves for operating the same alternately in unison, a diving bell member mounted for vertical movement in said tank member and enclosing the area above the upper ends of said tubes, a volume of water in said tank member forming a water seal for the lower open end of said diving bell, one of said members bearing indicia, and the other member having a portion cooperable with said indicia for indicating the tidal volume of such in-flow.

References Cited by the Examiner

UNITED STATES PATENTS 3,078,846 2/1963 Novelli _____ 128—142

FOREIGN PATENTS 257,574 4/1949 Switzerland.

RICHARD A. GAUDET, *Primary Examiner.*

LOUIS R. PRINCE, *Examiner.*